Feb. 15, 1944.  P. M. FREER  2,341,915
BRAKE
Filed Oct. 26, 1942  2 Sheets-Sheet 1

INVENTOR.
PHELPS M. FREER
BY
ATTORNEYS

Feb. 15, 1944.   P. M. FREER   2,341,915
BRAKE
Filed Oct. 26, 1942   2 Sheets-Sheet 2
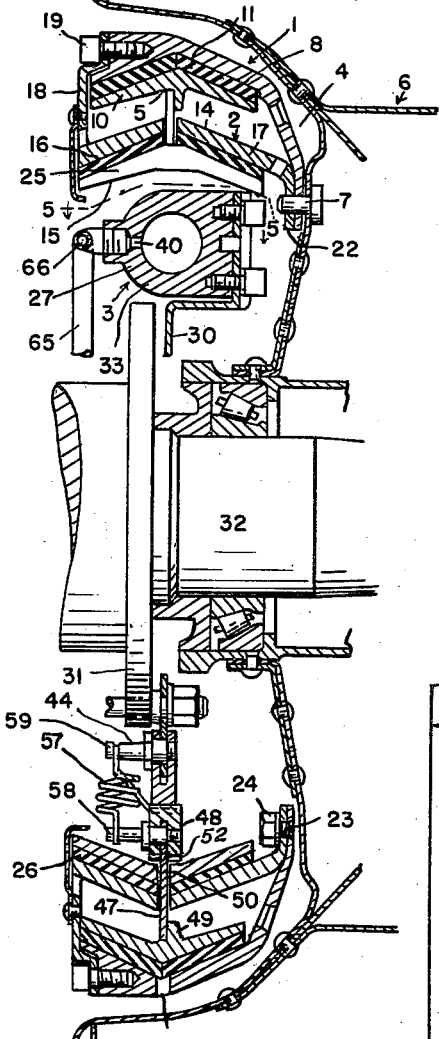
FIG. 2.
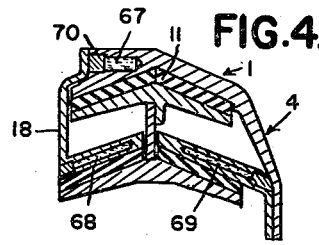
FIG. 4.
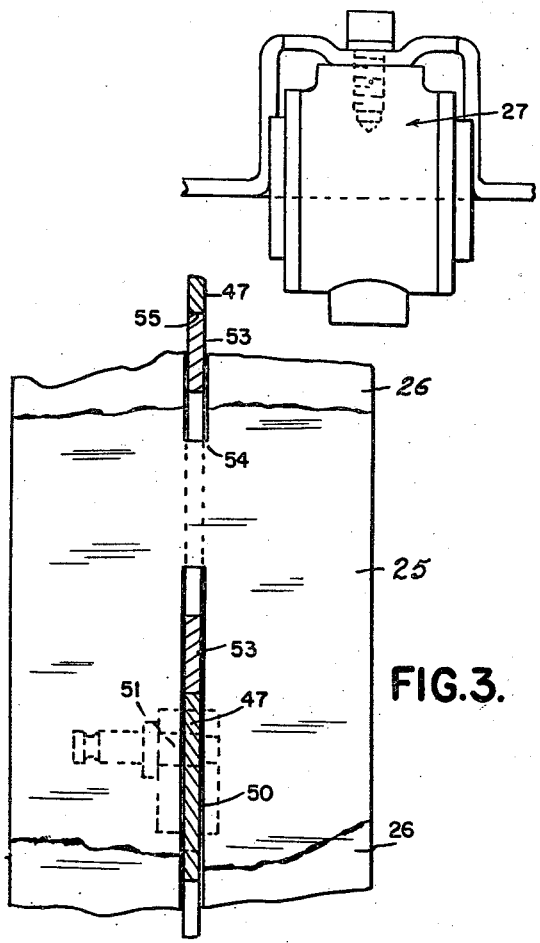
FIG. 5.
FIG. 3.
FIG. 6.   FIG. 7.
INVENTOR.
PHELPS M. FREER
BY
Whittemore Hulbert & Belknap.
ATTORNEYS Patented Feb. 15, 1944

2,341,915

UNITED STATES PATENT OFFICE 2,341,915

BRAKE

Phelps M. Freer, Detroit, Mich.

Application October 26, 1942, Serial No. 463,397

9 Claims. (Cl. 188—79)

The invention relates to brakes and refers more particularly to brakes of that type comprising a plurality of sets of relatively rotatable friction members.

The invention has for one of its objects to provide a brake of the type in question which is constructed and arranged to improve and simplify the brake.

The invention has for another object to provide an improved actuating mechanism for the brake.

The invention has for a further object to provide an improved anchoring means for the brake.

With these as well as other objects in view, the invention resides in the novel features of construction and combinations and arrangements of parts as more fully hereinafter set forth.

In the drawings:

Figure 1 is an inboard elevation, with parts broken away, of a brake embodying the invention;

Figures 2, 3 and 4 are cross sections on the lines 2—2, 3—3, and 4—4, respectively, of Figure 1;

Figure 5 is a cross section on the line 5—5 of Figure 2;

Figure 6 is an enlarged end view of one of the actuators;

Figure 7 is an elevation of Figure 6.

Figure 1:
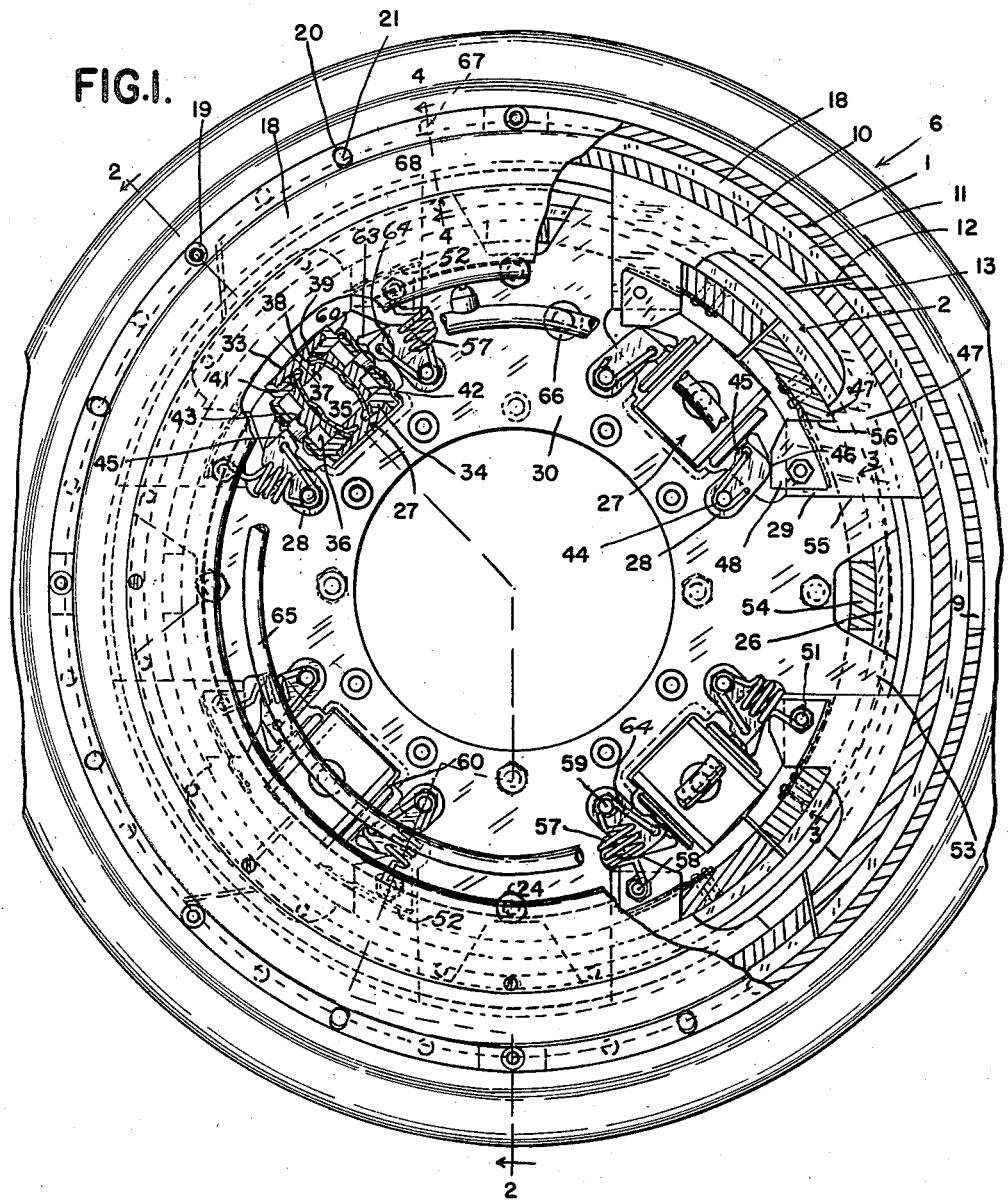

The brake, as illustrated in the present instance, is designed for use with an airplane landing wheel, although it is apparent that it may be otherwise used, as with motor vehicle wheels, and the like. The brake comprises the outer and inner sets 1 and 2 of relatively rotatable friction members and the actuating mechanism 3.

The outer set 1 comprises the rotatable friction member 4 and the non-rotatable friction member 5. The rotatable friction member 4 is an outer brake drum non-rotatably mounted on the airplane landing wheel 6 by suitable means, such as the dowels 7, which are secured to the wheel and slidably extend through holes in the back or web of the outer brake drum. The brake drum has a V-shaped internal friction face with the side portions 8 converging radially outwardly toward the middle of the friction face, which latter is preferably provided with the radial openings 9 for the escape of lining dust. The non-rotatable friction member 5 comprises the annular series of V-shaped outer brake shoes 10 having secured to their radially outer faces the brake lining 11 which is V-shaped and complemental to the friction face of the brake drum. For the purpose of securing substantially 360° contact between the brake shoes and the brake drum and at the same time enabling assembly of the brake shoes within the brake drum, the ends of the brake shoes are correspondingly beveled, as indicated at 12 and 13, whereby the last brake shoe to be assembled within the brake drum can be moved in a generally endwise direction into place, at which time the beveled ends 12 are located radially outwardly of and overlap the adjacent beveled ends 13.

The inner set 2 comprises the rotatable friction member 14 and the non-rotatable friction member 15. The rotatable friction member 14 is a V-shaped inner brake drum within and concentric with the outer brake drum 4 and it is formed of the inboard section 16 and the outboard section 17 having internal friction faces converging radially outwardly toward the middle of the inner brake drum. The inboard section 16 is preferably integral with the annular flange 18 which extends generally radially outwardly at the inboard side of the outer brake drum 4 and the outer brake shoes 10 and is concentrically secured to the outer brake drum by the bolts 19. To secure concentricity of the outer brake drum 4 and the inboard section 16 and to provide for expansion and contraction of the outer brake drum without moving the inboard section, the flange is provided with the radially elongated holes 20 for receiving the dowels 21 upon the outer brake drum. The holes in the flange through which the bolts 19 extend are larger than the bolts to permit relative expansion and contraction. The outboard section 17 has the integral back or web 22 which is fixedly secured to the back or web of the outer brake drum by means of the bolts 23 and nuts 24 which are located intermediate the holes in the back or web of the outer brake drum for receiving the dowels 7. The outboard section is also formed with holes in its back or web for receiving the dowels. The inboard and outboard sections of the inner brake drum are spaced from each other a distance to provide for the insertion therebetween of the portion of the actuating mechanism for directly forcing the outer brake shoes 10 into engagement with the outer brake drum 4. The friction member 15 comprises the annular series of V-shaped inner brake shoes 25 having secured to their radially outer faces the V-shaped brake lining 26 for engaging the internal friction face of the inboard and outboard sections forming the inner brake drum. The inner brake shoes correspond in number to the outer brake shoes and the ends of the inner brake shoes are closely adjacent and parallel to the radius which passes through the beveled ends of the outer brake shoes substantially midway of their radially outer and inner faces.

The actuating mechanism 3 comprises the annular series of angularly spaced actuators 27, the swinging levers 28 and the arm members 29 operatively connected to the outer and inner brake shoes. The actuators are wheel cylinders fixedly secured to the anchor disc 30, which latter is fixedly secured to the flange 31 of the support having the shaft 32 on which the wheel 6 is journaled. The wheel cylinders are located so that their longitudinal centers are in the radii passing midway between the adjacent ends of the inner brake shoes 25. Each wheel cylinder is formed of the housing 33, the caps 34, the diaphragms 35, and the plungers 36. The housing has at its middle the internal flange 37 which is formed in its ends with the annular grooves 38 for receiving the annular beads 39 at the edges of the diaphragms. The flange and diaphragms form a chamber for receiving braking fluid under pressure through the port 40. The caps are threaded into the ends of the housing and abut the rings 41 which, in turn, abut the diaphragms and clamp their beads in the grooves. The rings non-rotatably engage the diaphragms during the turning of the caps so that abrasion of the diaphragms is prevented. The caps form cylinders for guiding the plungers which have the heads 42 abutting the diaphragms and the rods 43 extending through the end walls of the caps and engaging the levers 28.

The levers are located at the ends of the wheel cylinders and are pivoted at their radially inner ends by the pins 44 on the anchor disc 30. The levers have at their radially outer ends the lateral projections 45 for engaging the ends of the rods 43 and also the rounded or convex bearing surfaces 46 for directly engaging the arm members 29.

The arm members 29 comprise the arms 47 and the bifurcated abutments 48. Each arm 47 is in the nature of a plate fixedly secured to an end of an outer brake shoe as by being welded to the internal radial rib 49 of the brake shoe. Each arm extends through the space between the inboard and outboard sections 16 and 17 of the inner brake drum and also through a peripherally extending opening 50 in the inner brake shoe. An abutment 48 straddles the radially inner end of each arm inside the inner brake shoe and is fixedly secured thereto by suitable means, such as the stud 51. The radially inner face of each abutment engages the rounded bearing surface of the adjacent link. 52 are bifurcated springs for operatively connecting the inner brake shoes to the arm members. Each spring is located at the radially inner side of an inner brake shoe and has bifurcations spaced therefrom and at the opposite sides of the arm 47 and abutting the radially outer faces of the bifurcations of the abutment secured to the arm. The solid end portion of each spring is suitably secured to the inner brake shoe as by means of rivets.

To anchor the outer brake shoes 10, the anchor disc is provided with the radially outwardly extending projections 53 which extend freely through the peripheral openings in the inner brake shoes 25 through which the arms on the outer brake shoes pass. Each projection 53 is preferably bifurcated so that the peripheral openings in each inner brake shoe are separated by an integral part 54 of the inner brake shoe with the integral part extending between the furcations. The edges of each projection form bearing surfaces 55 which are parallel to the radius passing through the middle of the projection and these bearing surfaces are engageable with the adjacent edges of the arms 47 to guide the same during the movement of the outer brake shoe toward and away from the outer brake drum. The inner brake shoes are guided, in turn, by the arms 47, each of which has the edge 56 opposite the edge engaging the projection 53 for slidably engaging the adjacent edge of the inner brake shoe forming the end of the peripheral opening through which the associated arm extends.

For the purpose of returning the brake shoes to their off or retracted positions, I have provided the coil springs 57, each of which is secured at one end to the extension 58 of the stud 51 and at the other end to the extension 59 of the pin 44. These springs return the outer brake shoes to their off or retracted positions. To return the inner brake shoes to their off or retracted positions, the arms 47 have the shoulders 47' overlying the radially outer sides of the inner brake shoes.

To provide for wear and maintain substantially constant clearance between the linings of the inner and outer brake shoes and the inner and outer brake drums, the rotatably adjustable stop discs 60 are provided at the opposite ends of each wheel cylinder. Each disc has the peripheral flange 61 which preferably snaps into an annular groove in the periphery of the end wall of the associated cap. Each disc also has the annular series of angularly spaced bosses 62 which are at different elevations and any one of which is engageable with the finger 63 formed at the radially outer end of each lever 28 radially outwardly beyond the lateral projection 45.

To resiliently hold the fingers 63 of the levers 28 against the bosses of the stop discs, the springs 57 are preferably provided with the extensions 64 between the extensions 59 of the pins 44 and the radially outer ends of the levers. These spring extensions also serve through the levers to return the plungers to their off positions.

The ports 40 of the wheel cylinders are connected to the annular tube 65 which is adapted to be connected at 66 to the master cylinder. As a result, the wheel cylinders are simultaneously operable and when braking fluid under pressure is forced into the wheel cylinders it acts upon the diaphragms 35 to move the plungers 36 in opposite directions. As a result, the rods 43 engage the lateral projections 45 of the swinging levers 28 to swing these levers about the pins 44 and move the arm members 29 generally radially outwardly along the projections 53 of the anchor disc 30. The arm members directly move the outer brake shoes 10 and the bifurcated abutments 48 of the arm members through the springs 52 to move the inner brake shoes 25. When the pressure upon the braking fluid is released, the coil springs 57 return the outer brake shoes to their off position and the extensions 64 of the coil springs return the swinging levers to positions abutting the stop discs 60. Inasmuch as the arms 47 upon the outer brake shoes overlap the radially outer sides of the inner brake shoes, the return of the outer brake shoes positively compels the return of the inner brake shoes to their off positions.

It will be noted that the rounded or convex bearing surfaces 46 of the levers 28 have a camming action on the arm members 29 for applying the brake shoes. It will also be noted that the bifurcated projections 53 of the anchor disc 30 extend through the inner brake shoes 25 with limited working clearance between the inner brake shoes and the projections at the sides of the latter. The anchor disc being secured in a predetermined axial position with respect to the wheel serves to axially position the inner brake shoes, which latter in turn serve to axially position the inner brake drum 14 because of the V-shaped sections. The inner brake drum in turn serves to axially position the outer brake drum 4 which serves to axially position the outer brake shoes 16. As a result, the inner brake shoes, the inner brake drum, the outer brake drum and the outer brake shoes are axially centered with respect to each other within relatively close limits and are axially positioned with respect to the wheel, all within relatively close limits, although the brake is not fixedly secured to the wheel. The operative axial relation of the parts of the brake with respect to each other and of the brake with respect to the wheel is maintained and the wheel may be readily removed separately from the brake.

To facilitate the dissipation of heat generated during the braking, the outer and inner brake drums are provided with angularly spaced sealed chambers for a material of relatively high thermal conductivity, such as mercury, or for a material of relatively high thermal conductivity and relatively low melting point, such as sodium, or a composition containing 55% potassium nitrate and 45% sodium nitrite. More in detail, the outer brake drum 4 is provided with the angularly spaced axially extending chambers 67 and the inboard and outboard sections 16 and 17, respectively, of the inner brake drum are provided with the angularly spaced sealed chambers 68 and 69, respectively. All of these chambers are sealed by the plugs 70.

What I claim as my invention is:

1. A brake comprising inner and outer brake drums, inner and outer brake shoes engageable with said inner and outer drums and actuating mechanism for said shoes comprising arm members on said outer shoes extending past said inner shoes, actuating members engaging the arm members of adjacent outer shoes, an actuator for said actuating members, and actuating members between said arm members and the adjacent inner shoes.

2. A brake comprising inner and outer brake drums, inner and outer brake shoes engageable with said inner and outer drums and actuating mechanism for said shoes comprising arm members on said outer shoes extending past said inner shoes, swinging levers engaging the arm members of adjacent outer shoes, an actuator between and engaging said levers, and resilient actuating members between said arm members and the adjacent inner shoes.

3. A brake comprising inner and outer brake drums, inner and outer brake shoes engageable with said inner and outer drums, an anchor disc and actuating mechanism for said shoes comprising arm members on said outer shoes extending past said inner shoes and held from circumferential movement by said anchor disc and holding said inner shoes from circumferential movement, actuating members engaging the arm members of adjacent outer shoes, an actuator for said actuating members, and actuating members between said arm members and the adjacent inner shoes.

4. A brake comprising inner and outer brake drums, inner and outer brake shoes engageable with said inner and outer brake drums, an anchor disc having radial projections at its outer edge and actuating mechanism for said shoes comprising arm members on said outer shoes extending past said inner shoes, said arm members slidably engaging said projections and also said inner shoes, and simultaneously operable actuators operatively connected to the arm members of adjacent outer shoes.

5. A brake comprising inner and outer brake drums, inner and outer brake shoes engageable with said inner and outer drums, an anchor disc having radial projections extending freely through said inner shoes and actuating mechanism for said shoes comprising arm members on said outer shoes adjacent their ends, said arm members extending through said inner shoes and slidably engaging the same and also slidably engaging said projections, swinging levers engaging the radially inner ends of said arm members, and actuators mounted on said anchor disc and located between the swinging levers engaging the arm members at adjacent ends of adjacent outer shoes.

6. A brake comprising inner and outer brake drums, inner and outer brake shoes engageable with said inner and outer drums, actuating mechanism for said shoes comprising arm members on said outer shoes extending past said inner shoes, actuating members engaging the arm members of adjacent outer shoes, an actuator for said actuating members and actuating members between said arm members and the adjacent inner shoes, and means for normally holding said inner and outer shoes in retracted position comprising projections on said arm members extending over the radially outer surfaces of said inner shoes and spring means connected to said arm members for yieldably moving the same generally radially inwardly, said spring means being also operatively connected to said first mentioned actuating members to urge the same toward said actuator.

7. A brake for a wheel comprising inner and outer brake drums having V-shaped internal friction faces, one of said drums being axially slidably mounted on the wheel and fixedly secured to the other of said drums, inner and outer brake shoes having V-shaped faces engageable with said friction faces of said inner and outer drums, and an anchor disc having a predetermined axial relation with respect to the wheel and axially positioning said inner shoes.

8. A brake for a wheel comprising inner and outer brake drums, one of said drums being axially slidably connected to the wheel and fixedly secured to the other of said drums, inner and outer brake shoes engageable with said inner and outer drums, an anchor disc having a predetermined axial relation with respect to the wheel and axially positioning said inner shoes, and means on said inner shoes, inner drum, outer drum and outer shoes for axially positioning said inner drum, outer drum and outer shoes with respect to said inner shoes.

9. A brake for a wheel comprising a brake drum member axially slidably connected to the wheel, a brake shoe member engageable with said drum member, an anchor having a predetermined axial relation with respect to the wheel, said anchor engaging and axially positioning one of said members, and cooperating means on said members for axially positioning the same with respect to each other.

PHELPS M. FREER.